Dec. 19, 1944.   J. G. INGRES   2,365,470
CLUTCH CONTROL MECHANISM
Filed May 20, 1941
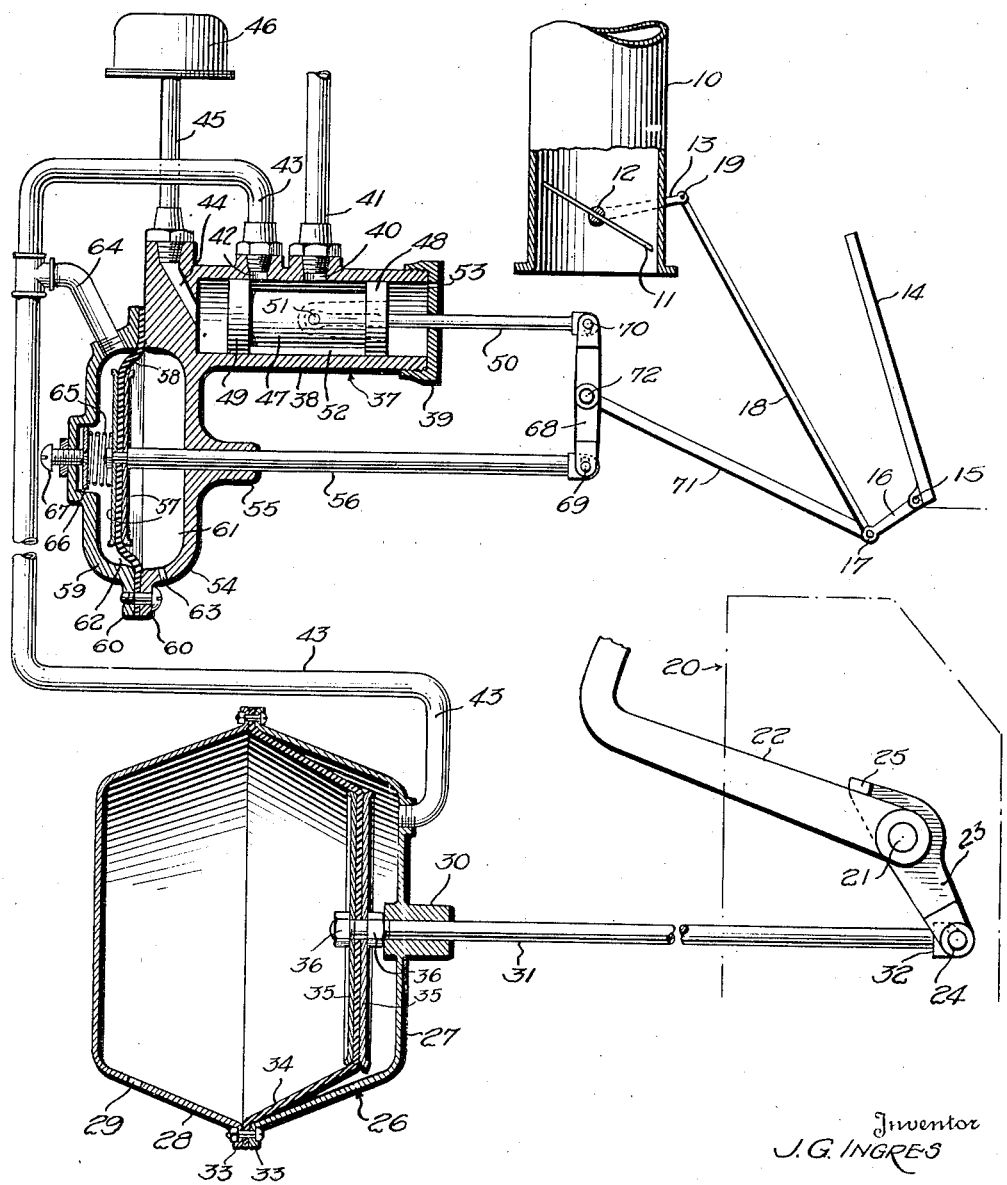
Inventor
J. G. INGRES Patented Dec. 19, 1944

2,365,470

UNITED STATES PATENT OFFICE 2,365,470

CLUTCH CONTROL MECHANISM

Jeannot G. Ingres, Detroit, Mich., assignor to Hill Engineering Corporation, Richmond, Va., a corporation of Virginia Application May 20, 1941, Serial No. 394,343

8 Claims. (Cl. 192—.01)

This invention relates to a motor vehicle clutch control mechanism and is an improvement over such structures as that shown in the prior patent to Edward G. Hill No. 1,964,693, granted June 26, 1934.

As is well known, the earlier types of power operated mechanisms for disengaging vehicle clutches and for releasing the elements of the clutch for movement toward operative engagement proposed the use of a control valve mechanism which was operable in such a way that releasing of the accelerator pedal effected clutch disengagement and depression of the accelerator pedal released the elements for movement toward operative engagement in two stages, the first being relatively rapid and the second being relatively slower. Such two-stage clutch engagement was provided so that complete clutch engagement could be carried out in a minimum length of time by permitting relatively rapid movement of the clutch elements approximately to the point of initial engagement, followed by the slower movement of the clutch elements into engagement as the engine speed increased, to thereby prevent the "grabbing" of the clutch elements.

One of the principal difficulties involved in the earlier types of such mechanisms lay in the fact that it was substantially impossible to provide a mechanism which would arrest or retard the movement of the clutch elements accurately at the point of initial engagement. The prior mechanism of the Hill patent referred to was developed to overcome the disadvantage referred to and was found to be quite perfect in operation. Such mechanism employed a follow-up control valve mechanism employing a pair of valves one on which was connected for operation by the accelerator pedal or by the engine throttle, and the other of which constituted a follow-up valve and was controlled in accordance with pressures in the fluid pressure motor which was connected to the clutch.

The follow-up valve referred to was connected to a diaphragm subject to pressure in a chamber connected to a conduit leading to the clutch operating motor so as to be responsive to pressures therein. Upon operation of the first mentioned valve to admit air into the clutch motor, the clutch springs would immediately move the clutch elements in the direction of operative engagement and the admission of air into the motor was accompanied by a corresponding admission of air into and a raise in pressure in the diaphragm chamber to release the follow-up valve for a follow-up movement with respect to the first named valve. Upon initial contact of the clutch elements, the follow-up valve would act to cut off or materially retard the admission of air into the clutch motor, and accordingly the mechanism operated automatically to arrest or check the movement of the clutch elements accurately at the point of initial engagement.

As previously stated the prior mechanism shown in the Hill patent referred to operated perfectly for its intended purpose and it possesses the single disadvantage of being relatively costly to manufacture. This is due to the number of parts which were required to be machined for cooperative operation. For example, the mechanism involved a valve casing and a pair of valves axially relatively slidable therein, one valve, as stated, being operable with the throttle valve and the other being mounted to partake of a follow-up action. Both valves were required to be provided with ports and since one fitted within the other, the contacting faces of the valves were required to be machined for a relatively accurate fit. Moreover, the external surface of the outer valve and the internal surface of the valve casing were required to be similarly finished.

An important object of the present invention is to provide an automatic clutch control mechanism embodying all of the advantages of the structure of the Hill patent referred to wherein simpler parts requiring less machine work are required, thus permitting the control mechanism to be much more cheaply manufactured.

A further object is to provide a mechanism of this character employing the principle of the pressure controlled means for the follow-up action, but wherein only a single valve is employed instead of the axially slidable valves of the prior construction.

A further object is to provide a novel compact control valve mechanism having a single simple type of spool valve to which motion is transmitted upon operation of the accelerator pedal to change the fluid pressure in the clutch operating motor, and wherein a simple type of pressure controlled means is employed for moving the same valve to provide the follow-up action of the clutch elements with respect to the accelerator pedal.

Other objects and advantages of the invention will become apparent during the course of the following description.

In the drawing I have shown one embodiment of the invention. In this showing:

The figure is a sectional view showing parts of the mechanism in a schematic layout, parts being broken away and parts being shown in elevation.

Referring to the drawing the numeral 10 designates the intake pipe of a motor vehicle engine to which the usual carburetor (not shown) is connected, the intake pipe being provided with a butterfly throttle valve 11 mounted on a shaft 12 to which is connected an arm 13 for rocking the valve 11. The throttle valve is adapted to be controlled in the usual manner through operation of the accelerator pedal. This pedal is shown in the present instance and is indicated by the numeral 14 and is pivotally supported as at 15 in any desired manner. A crank arm 16 is connected to the accelerator pedal and has its end pivoted as at 17 to one end of a rod 18, this rod having its other end pivotally connected as at 19 to the free end of the arm 13.

The vehicle is provided with the usual clutch generally indicated by the numeral 20 and having the usual clutch elements (not shown) controlled by a rock shaft 21 having an operating pedal 22 connected thereto. The shaft 21 has freely mounted thereon an arm 23 carrying a pivot pin 24 at its lower end and provided at its upper end, above the shaft 21, with a lug 25 engageable with the clutch pedal 22.

A fluid pressure operated motor indicated as a whole by the numeral 26 is adapted to operate the arm 23 and thus actuate the clutch pedal 22. In the present instance the motor 26 is illustrated as comprising a pair of casing sections 27 and 28, the latter of which is vented to the atmosphere as at 29 for a purpose which will become apparent. The casing section 27 carries a bearing 30 in which is slidably mounted a rod 31 having a connection 32 at its outer end through which the pivot pin 24 passes. The casing sections are provided with peripheral flanges 33 between which is clamped the peripheral portion of a diaphragm 34. Disks 35 are clamped against opposite sides of the central portion of the diaphragm and are secured to the inner end of the rod 31 by nuts 36.

The valve mechanism for controlling the operation of the motor is indicated as a whole by the numeral 37. This valve mechanism comprises a generally cylindrical valve housing 38 capped at one end as at 39. The valve housing is provided with a vacuum port 40 to which is connected a pipe 41 leading to the intake manifold of the motor vehicle engine or to any other source of partial vacuum. The valve housing is further provided with a port 42 connected to one end of a pipe 43, the other end of this pipe being tapped into the motor casing section 27. The valve housing 38 is provided with an atmospheric passage 44 to which air may be directly admitted, but it is preferred that a pipe 45 be tapped into the passage 44 and provided with an air cleaner 46.

A spool valve 47 is slidable in the valve casing and is provided with heads 48 and 49 at its ends. An operating rod 50 extends through the cap 39 and a pin 51 connects the valve 47 to the rod 50. The reduced central portion of the valve provides a pressure space 52 which is adapted to afford communication between the ports 40 and 42, when the valve is in the position shown, to connect the source of vacuum to the interior of the motor casing 27 to disengage the clutch. The valve is movable to the right as viewed in the figure to disconnect the port 42 from the port 40 and connect it to the atmospheric passage 44. In order to prevent the building up of air pressure in the right hand end of the valve housing, the cap 39 is preferably provided with a small vent opening 53.

A circular casing 54 is preferably cast integral with the valve housing 38 and is provided with a bearing 55 through which a rod 56 is slidable. This rod has its end within the casing 55 secured to disks 57 clamped against the opposite faces of a flexible diaphragm 58. A complementary casing 59, corresponding in shape to the casing 54, is arranged adjacent such casing and the two casings are provided with parallel peripheral flanges 60 between which the peripheral portion of the diaphragm 58 is clamped. The casing sections 54 and 59 with the diaphragm 58 respectively form chambers 61 and 62 the former of which is vented to the atmosphere by a small port 63 through the casing 54.

The chamber 62 communicates with the pipe 43 through a branch pipe 64, and accordingly it will be apparent that any pressure which is present in the pipe 43, and accordingly in the casing section 27 of the motor, will be duplicated in the pressure chamber 62. A spring 65 urges the diaphragm 58 toward the right as viewed in the figure and this spring engages a seat 66 adjustable by a screw 67 whereby the tensioning of the spring 65 may be varied for a purpose which will become apparent.

A walking beam 68 is pivoted at one end as at 69 to the rod 56 and is pivoted at its other end as at 70 to the rod 50. The pivots thus provided connect the walking beam 68 to both of the rods 50 and 56 and the pivot pins 69 and 70 operate in slots in the respective rods 50 and 56 to permit the walking beam to partake of limited swinging movement without causing any binding action of the parts. A rod 71 is adapted to transmit movement from the accelerator treadle 14 to the lever 68. The pivot pin 17, which connects the arm 16 to the rod 18, may likewise connect one end of the rod 71 to the arm 16, while the other end of the rod 71 is connected by a pivot pin 72 to the lever 68 intermediate the ends thereof.

The operation of the apparatus is as follows:

Assuming that the vehicle is at a standstill with the engine idling, the throttle valve 11 will be in the position shown in the figure and the crank 16 will occupy the solid line position shown. Under such conditions, the valve 47 also will occupy the position shown and the ports 40 and 42 will be in communication with each other. Accordingly the casing 27 of the motor 26 will be connected to the source of vacuum and will be in the position illustrated, under which conditions the arm 23 will be swung to the right with the lug 25 holding the clutch pedal 22 in the depressed position, and the clutch elements (not shown) obviously will be disengaged. At the same time, the vacuum in the pipe 43 will be communicated to the chamber 62 and atmospheric pressure in the chamber 61 will hold the diaphragm 58 in the left hand position, as shown.

Under the conditions referred to, the engine will be idling with the clutch disengaged, and the operator may make the necessary gear shift to place the transmission in low gear preparatory to starting movement of the vehicle. After the shift has been made, the operator will depress the accelerator pedal to move the throttle 11 away from the idling position to accelerate the engine speed. Movement will be transmitted to the throttle by the crank 16 which will turn in a counterclockwise direction as the accelerator pedal is depressed. Movement of the crank 16 also will be imparted to the rod 71, this rod being pulled to the right as viewed in the figure to transmit movement to the walking beam or floating lever 68. The diaphragm 58 being held in the left hand position by atmospheric pressure in the chamber 61, it will be obvious that the pull of the rod 71 will turn the floating lever 68 about the pivot 69, and accordingly the pivot pin 70 will move the valve 47 toward the right.

When the valve 47 moves toward the right, as stated, the valve head 49 will move across the port 42 to close communication between this port and the vacuum port 40 and at the same time will open the port 42 to communication with the atmospheric passage 44. Accordingly air will rush into the space to the left of the valve head 49, thence through the port 42 and pipe 43 into the motor casing 27. The usual clutch springs (not shown) urge the clutch elements toward operative engagement, and such movement of the clutch elements will be accompanied by turning movement of the clutch shaft 21 in a clockwise direction. With the clutch elements disengaged, the clutch springs will have exerted a constant force tending to turn the shaft 21 in a clockwise direction and upon the admission of air into the motor casing 27, the immediate increase in pressure in the casing 27 reduces the differential pressures affecting the diaphragm 34. Accordingly the clutch springs will effect movement of the clutch elements toward operative engagement and at the same time will turn the shaft 21 in a clockwise direction and the pedal 22 will engage the lug 25 to swing the arm 23 in the same direction and thus move the rod 31 and diaphragm 34 toward the left.

The same increase in pressure that occurs in the casing 27 obviously occurs in the diaphragm chamber 62, this chamber being connected to the pipe 43 through the branch pipe 64. Accordingly it will be apparent that immediately upon the occurrence of the increase in pressure referred to, the spring 65 will move the diaphragm 58 toward the right to rock the floating lever 68 about the pivot 72 to tend to restore the valve 47 to its previous position, the valve 47 being moved toward the left when the floating lever 68 rocks in the manner last referred to.

In the ordinary operation of the mechanism when the accelerator is initially depressed, the movement of the diaphragm 58 by the spring 65 will not cause the head 49 to completely close communication between the port 42 and the atmospheric passage 44. In the designing of the apparatus the increase in air pressure in the diaphragm chamber 62 incident to initial movement of the accelerator pedal from the idling position will move the valve head 49 to a position only partially cutting off communication between the port 42 and air passage 44.

In connection with the foregoing operation of the elements incident to initial depression of the accelerator pedal, it will be apparent that the increase in pressure in the motor chamber 27 will depend upon three elements, namely, (1) the area of the orifice through which air is admitted into the port 42; (2) the tension of the clutch springs and consequently the force applied through the rod 31 to tend to move the diaphragm 34 toward the left as viewed in the figure; and (3) the area of the diaphragm 34. These three conditions in a given relationship to each other will cause a predetermined rate of increase in pressure in the casing 27, the speed of movement of the diaphragm 34 and the area of this diaphragm, as related to each other, being enabled to draw air into the casing 27 only at a given rate with respect to the area of the orifice through which air is being admitted.

It will be apparent that any change in either of the three factors referred to will result in an immediate change in pressure in the motor casing 27. Bearing this in mind, it will be apparent that immediately upon initial engagement of the clutch elements, movement of the diaphragm 34 will be retarded, the initial contact of the clutch elements having such effect on the movement of the parts as will be obvious. This reduction in the speed of movement of the diaphragm 34 renders the area of the orifice represented by the uncovered portion of the port 42 effective for admitting air into the motor casing 27 at a greater rate in proportion to the rate of movement of the diaphragm 34. Upon initial engagement of the clutch elements, therefore, an immediate rise in pressure will occur in the motor casing 27 and of course in the pipe 43, and this rise in pressure likewise immediately occurs in the diaphragm chamber 62. When this rise in pressure in the chamber 62 occurs, the spring 65 will immediately move the diaphragm 58 and the rod 56 further to the right, thus swinging the lever 68 about the pivot 72 and moving the valve 47 further toward the left to cut off, or substantially cut off, the communication between the port 42 and the air passage 44.

As a result of the foregoing operation, the admission of air into the motor casing 27 will be entirely or substantially cut off immediately upon the initial contacting of the clutch elements, and accordingly movement of the clutch elements toward each other will be retarded or arrested, depending upon operation of the accelerator treadle 14. If the accelerator treadle is initially depressed and then stopped, movement of the clutch elements will be arrested due to the complete cutting off of the port 42 from the passage 44 by the valve head 49. On the other hand, if the operator continues the downward movement of the treadle 14, the movement of the diaphragm 58 toward the right and the tendency of this movement to effect movement of the valve 47 to the left will occur while the rod 71 is being moved toward the right by the depression of the accelerator pedal, and under such conditions, movement of the clutch elements will not be arrested but will be retarded. In either case, the operation is proper for that particular condition. If the operator stops movement of the treadle 14 prior to substantial acceleration of the engine, it is proper that the movement of the clutch elements be arrested at the point of initial engagement pending further depression of the accelerator pedal. If the operator does not stop the downward movement of the treadle 14, it is proper that the clutch elements be retarded at the point of initial engagement. Under such conditions there will be a slow engagement of the clutch elements to effect the transmission of power to start the vehicle in motion, and if there has been an arresting movement of the clutch elements, further depressing of the accelerator pedal will accelerate the engine speed while at the same time admitting air into the casing 27 at a slow rate to effect clutch engagement.

It will be apparent that after the arresting or retarding point is reached, further movement of the accelerator pedal causes movement of the rod 71 to the right tending to impart similar movement to the valve 47 to uncover the port 42 to the atmosphere. This operation is accompanied by a progressive increase in pressure in the motor casing 27 and in the diaphragm chamber 62, and the latter permits the spring 65 to move the rod 56 to the right to tend to rock the lever 68 in a counter-clockwise direction to counteract the movement being imparted to the valve 47 by the accelerator-operated rod 71.

When the proper vehicle speed has been attained in low gear the operator will release the treadle 14, which movement will cause the lever 68 to swing in a counter-clockwise direction about the pivot 69 and move the valve 47 to its extreme left hand position connecting the ports 40 and 42. Thus the motor casing 27 will be connected to the source of vacuum and the diaphragm 34 will be moved to the clutch releasing position. The reduction in pressure occurring in the casing 27 will be duplicated in the diaphragm chamber 62, and air pressure in the chamber 61 will move the diaphragm 58 to its extreme left hand position as shown in the figure, in which case the parts will occupy the position shown with the right hand limit of the valve head 49 arranged at the left hand limit of the port 42.

It will be apparent that the operation of the diaphragm 58 is such that for any movement imparted to the valve 47 by the accelerator, the diaphragm 58 provides a follow-up action to tend to arrest the movement of the valve 47, thus stopping the valve in the proper position for any given position of the treadle 14.

From the foregoing it will be apparent that the present mechanism, in principle, is identical with that disclosed in the Hill Patent No. 1,964,693, referred to above, the action of the diaphragm 58 providing a follow-up action and effecting automatic arresting or retarding of the clutch elements approximately at the point of initial engagement, regardless of where the point of initial engagement occurs. It will be obvious that the retarding or arresting operation takes place automatically and at exactly the right point, depending upon operating conditions to be referred to, thus making it unnecessary to adjust any elements of the apparatus to cause such automatic operation to properly take place. The only adjustment necessary is the tensioning of the spring 65 by the screw 67 to cause a proper follow-up action by the diaphragm 58 in accordance with pressure variations in the chamber 62.

The operation in effecting clutch engagement for any gear ratio of the transmission will be the same as the operation described except that in the normal operation of a vehicle it is the conventional practice for the operator to depress the accelerator more rapidly and to a greater extent in second gear than in first gear, and the same thing is true in high gear with relation to second gear. Moreover, in each gear position it is possible to effect faster clutch engagement without any "grabbing" of the clutch elements. The present apparatus takes care of the normal operation in different gear ratios in the same manner as in the Hill Patent No. 1,964,693 referred to above.

In this connection, it will be noted that when the accelerator pedal is depressed from the idling position shown in the figure, the head 49 will move to the right over the port 42 to uncover the latter at least to some extent so as to admit air into the motor 26, and while air is being admitted into the motor it obviously is being likewise admitted into the diaphragm chamber 62 to release the diaphragm 58 for movement to the right to tend to move the valve 47 to the left to cut off communication between the port 42 and the atmosphere. The increase in pressure in the diaphragm chamber 62 and the distance of movement of the diaphragm 58 necessary for moving the valve 47 to the point at which the admission of air into the motor will be retarded, or cut off will depend upon the distance and speed of operation of the accelerator 14. The faster and further the accelerator pedal 14 is depressed, the further the pivot point 72 will be moved to the right of the position shown, and accordingly the further the diaphragm 58 will have to move to the right to effect the checking operation. Accordingly, while the check point has been described as occurring "approximately" at the point of initial engagement of the clutch elements, it will be obvious that the check point will occur progressively later in accordance with the progressively more rapid opening movement of the engine throttle incident to depression of the accelerator pedal. Actually, it is preferred that for the fastest operation the check point occur slightly past the point of initial engagement of the clutch elements, with the checking or retarding operation occurring slightly earlier for less rapid operation of the accelerator pedal. This operation provides for relatively slow clutch engagement in low gear, faster engagement in second gear, and still more rapid engagement of the clutch elements in high gear, these varying operations occurring in accordance with the usual operation of the accelerator treadle.

It also will be apparent that the present apparatus provides a high degree of maneuverability. For example, if the gear set is in low gear and the operator slowly depresses the accelerator pedal as when pulling out from a curb into a traffic lane, rather slow engagement of the clutch elements will take place and the vehicle will move very slowly forwardly. If, prior to pulling into a traffic lane, the operator finds it necessary to slow down or stop for traffic approaching from the rear, it merely is necessary for him to ease up on the accelerator pedal, and this operation will move the valve head 49 to the left a distance depending upon the extent to which the accelerator treadle has been released. Accordingly the clutch elements, depending upon the mode of operation of the treadle 14, will be partially released or will be completely released to permit the vehicle to be stopped.

Under the conditions just referred to, the depressing of the accelerator pedal sufficiently to effect contact of the clutch elements and the transmission of power to the rear wheels followed by the operator's stopping the movement of the accelerator treadle, movement of the clutch elements toward the positively engaged position will be completely arrested. Under normal conditions, where downward movement of the accelerator treadle is continued, the clutch elements will not be arrested but will have their movement retarded approximately at the point of initial engagement. Thus the present apparatus operates either to retard or completely arrest movement of the clutch elements, depending entirely upon the mode of operation of the accelerator pedal.

As distinguished from the structure of the Hill patent referred to the present apparatus employs a single simple spool type valve 37 instead of the two axially slidable valves one of which is slidable in the casing, as in the patent referred to. This distinction in the present mechanism over the prior apparatus permits a very material reduction in the cost of producing the device. Not only is the machine work incident to two relatively moving parts instead of three very much cheaper to produce, but it also will be apparent that the use of the single valve eliminates the necessity for providing the porting which is necessary when two relatively movable valves are employed. The valve housing 38 may be conveniently cast integral with the diaphragm casing 54, thus further minimizing the cost of manufacture of the device.

The use of the arm 23 and its lug 25 or some similar arrangement is preferred inasmuch as it permits movement of the clutch pedal 22 independently of the motor 26 and the elements operated thereby. In the event of a failure of power in the mechanism, the operator obviously might manually operate the clutch pedal 22 for transmitting movement to the arms 23, rod 31 or diaphragm 34.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Clutch operating mechanism for a motor vehicle including a clutch and a throttle for the vehicle engine, comprising a power device connected to the vehicle clutch, control mechanism for said power device having a single movable control element mounted for rectilinear movement, mechanical connections including a floating lever connecting said movable element to the engine throttle, and means responsive to the degree of energization of said power device and having a movable member mounted for movement parallel to the line of movement of said control element and connected to said floating lever to cause said movable element to effect a follow-up action of said power device with respect to movement of the engine throttle.

2. Clutch operating mechanism for a motor vehicle including a clutch and a throttle for the vehicle engine, comprising a power device connected to the vehicle clutch, control mechanism for said power device having a single movable control element mounted for rectilinear movement, a floating lever having one end mechanically connected to said control element, means connecting said floating lever intermediate its ends to the engine throttle, and means responsive to the degree of energization of said power device and having a member movable parallel to the line of movement of said control element and connected to the other end of said floating lever to control said movable element and effect a follow-up action of said power device with respect to movement of the engine throttle.

3. Clutch operating mechanism for a motor vehicle including a clutch and a throttle for the vehicle engine, comprising a fluid pressure operated power device connected to the clutch, a control valve mechanism therefor having a single movable valve, mechanical connections between said valve and the engine throttle, and means comprising a diaphragm responsive to variations in differential pressures in said power device to control said valve and effect a follow-up action of said power device with respect to movement of the engine throttle.

4. Clutch operating mechanism for a motor vehicle including a clutch and a throttle for the vehicle engine, comprising a fluid pressure operated power device connected to the clutch, a control valve mechanism therefor having a single movable valve, mechanical connections between said valve and the engine throttle, and means comprising a diaphragm responsive to variations in differential pressures in said power device to control said valve and effect a follow-up action of said power device with respect to movement of the engine throttle, said means being connected to said mechanical connections and operable therethrough to control said valve.

5. Clutch operating mechanism for a motor vehicle including a clutch and a throttle for the vehicle engine, comprising a fluid pressure operated power device connected to the clutch, a control valve mechanism therefor having a single valve, mechanical connections between said valve and the engine throttle and including a floating lever, and means comprising a diaphragm responsive to differential pressures in said power device and operatively connected to said floating lever to control said valve and effect a follow-up action of said power device with respect to movement of the engine throttle.

6. Clutch operating mechanism for a motor vehicle including a clutch and a throttle for the vehicle engine, comprising a fluid pressure operated power device connected to the clutch, a control valve mechanism therefor having a single valve, a floating lever mechanically connected at one end to said valve, mechanical means connecting said floating lever intermediate its ends to the engine throttle, and means comprising a chamber subject to changes in differential pressures in said motor, and a diaphragm forming one wall of said chamber and movable in accordance with pressure variations therein, said diaphragm having mechanical connection to the other end of said floating lever to control said valve therethrough and effect a follow-up action of said power device with respect to movement of the engine throttle.

7. Clutch operating mechanism for a motor vehicle including a clutch and a throttle for the vehicle engine, comprising a fluid pressure operated power device connected to the clutch, a control valve mechanism for said power device comprising a casing and a single valve movable therein to control pressures in one end of said power device, mechanical connections between said valve and the engine throttle, a two-part casing having one part fixed to said valve housing, a diaphragm between said casing parts and forming with one of said parts a pressure chamber subject to variations in pressure in said end of said power device, and means connecting said diaphragm to said mechanical connections to effect a follow-up action of said power device with respect to movement of the engine throttle.

8. Clutch operating mechanism for a motor vehicle including a clutch and a throttle for the vehicle engine, comprising a fluid pressure operated power device connected to the clutch, a control valve mechanism for said power device comprising a casing and a single valve movable therein to control pressures in one end of said power device, mechanical connections between said valve and the engine throttle and including a floating lever, a two-part casing one part of which is fixed to said valve housing, a diaphragm mounted between the parts of said casing and forming with one of said parts a pressure chamber subject to changes in pressure in said end of said power device, and means connecting said diaphragm to said floating lever to control said valve through said lever to effect a follow-up action of said power device with respect to movement of the engine throttle.

JEANNOT G. INGRES.